United States Patent [19]
Hyde

[11] Patent Number: 5,691,890
[45] Date of Patent: Nov. 25, 1997

[54] POWER SUPPLY WITH POWER FACTOR CORRECTION CIRCUIT

[75] Inventor: Richard Charles Hyde, Lochwinnoch, United Kingdom

[73] Assignee: International Business Machines Corporation, Armonk, N.Y.

[21] Appl. No.: 758,602

[22] Filed: Nov. 27, 1996

[30] Foreign Application Priority Data

Dec. 1, 1995 [GB] United Kingdom ............... 9524638

[51] Int. Cl.$^6$ ............... H02M 5/42; H02M 3/335; H02M 7/68
[52] U.S. Cl. ............... 363/89; 363/16; 363/20
[58] Field of Search ............... 363/89, 16, 21, 363/20, 56, 131; 323/207

[56] References Cited

U.S. PATENT DOCUMENTS

| | | | |
|---|---|---|---|
| 4,947,308 | 8/1990 | Gulczynski | 363/16 |
| 5,267,132 | 11/1993 | Gulczynski | 363/16 |
| 5,331,534 | 7/1994 | Suzuki et al. | 363/21 |
| 5,367,448 | 11/1994 | Carroll | 363/89 |
| 5,459,651 | 10/1995 | Maehara | 363/131 |

*Primary Examiner*—Peter S. Wong
*Assistant Examiner*—Bao Q. Vu
*Attorney, Agent, or Firm*—Anthony N. Magistrale

[57] ABSTRACT

Disclosed is a power supply which includes a transformer having a primary winding and a secondary winding. A rectifier circuit rectifies an input AC mains signal to produce a DC rectified mains signal. A power factor correction circuit transfers electrical power from the rectifier circuit to the primary winding. A switch is provided for transferring electrical power from the primary winding to the secondary winding. The power factor correction circuit includes a first diode having an anode connected to the rectifier circuit and a cathode connected to one end of the primary winding and a second diode having an anode connected to the rectifier circuit and a cathode connected to said one end of the primary winding via a snubber network. The correction circuit may also include a third diode having an anode connected to the rectifier circuit and a cathode connected to a second end of the primary winding via an inductor.

2 Claims, 1 Drawing Sheet

POWER SUPPLY WITH POWER FACTOR CORRECTION CIRCUIT

BACKGROUND OF THE INVENTION

1. Field of the Invention

The present invention relates generally to a power supply for an electrical appliance such as a visual display unit, and more particularly to a power supply having a power factor correction circuit.

2. Description of Related Art

The power factor relates the product of the rms values of voltage and current (usually expressed in voltamperes) delivered to a load by a main electricity supply to the power (expressed in watts) converted by the load. Specifically, the power in watts is equal to the number of voltamperes multiplied by the power factor of the load. For an ideal load, the power factor is unity. However, in practice the power factor is less than unity. In the interests of economical electricity distribution, it is desirable to maximize the power factor of electrical loads.

Different electrical appliances present different power factors to the AC electricity mains. A personal computer system, for example, typically presents a relatively low power factor to the AC mains. Thus, when many personal computer systems are installed in the same office building, the efficiency of electrical distribution at least through the office building is prejudiced. In an effort to prevent further degradation of the electricity supply, and thus to preserve energy resources, international standards are emerging to further reduce the minimum acceptable power factors for electrical appliances. An example of such a Standard is EN 6100-3-2 due to be in force in Japan in January 1996 and to be in force in Europe in January 1997. This Standard significantly restricts the acceptance limit of main power harmonics for electrical appliances.

A personal computer system typically includes a system unit having a microprocessor, memory, and mass storage device interconnected by a bus architecture; a raster scanned visual display unit connected to a video adapter of the system unit; and at least one input device such as a keyboard, mouse, or the like connected to an input adapter of the system unit. The display device typically comprises: a cathode ray display tube (CRT); drive circuitry for generating a raster scanned picture on the CRT in response to one or more video signals provided by the video adapter; and a switch mode power supply for converting AC mains electricity into DC power sources for powering the drive circuitry. A switch mode power supply typically supplies power to electrical circuitry by rectifying input AC mains, applying the DC rectified mains to the primary winding of a transformer, and alternately turning on and off the current flow through the primary winding, thereby transferring electrical energy to the secondary winding of the transformer. The time for which the current flow in the primary winding is turned on, or duty cycle is determined by the power demanded from the secondary winding via a feedback loop.

Manufacturers of general purpose switch mode power supplies have conventionally solved the problem of increasing power factor by increasing the switching or "chopping" frequency. However, this solution is not readily applicable to CRT displays because it is preferable to synchronize the power supply of the display to the horizontal deflection frequency in the interests of eliminating Objectionable picture interference.

A CRT display typically has a high mean power consumption relative to other components of a personal computer system. The high power consumption of the display and the aforementioned switching mechanism of the associated power supply lead towards a relatively high power factor for the display.

The current waveform drawn by a typical CRT display device from each AC mains cycle is a single, relatively narrow pulse temporally located at the center of the rectified mains waveform. One method of reducing mains power harmonics and thus increase power factor is to increase the width of the pulse. Another method of reducing mains power harmonics and thus increase power factor is to produce more current pulses so that the current waveform drawn approximates to the sinusoidal waveform of the mains.

In one conventional power factor correction circuit, a smoothing choke is added to the DC rectifier of a switch mode power supply. The choke increases the conduction angle of the power supply. The choke is not an expensive component. However, the operating frequency of the choke is required to be relatively low (typically 100Hz). This requirement leads to the choke being a relatively large and heavy component. Such components generally radiate significant AC and DC stray magnetic fields. In a CRT display, such magnetic fields can produce objectionable color purity error and screen jitter. Countermeasures to such effects include forming the choke core from high quality silicon iron laminations and steel or high permeability metal (eg: Mumetal) shielding. These countermeasures are expensive to implement and also mitigate against design simplicity because they incur addition of parts.

In another conventional power factor correction circuit, a pre-switcher circuit is added to the DC rectifier. The pre-switcher circuit increases the number of current pulses during each cycle of the rectified mains, and approximates their amplitude to the sinusoidal mains voltage. The circuit is also expensive to implement both in terms of component cost and additional manufacturing complexity.

SUMMARY OF THE INVENTION

The present invention is directed to a power supply which includes a transformer having a primary winding and a secondary winding, rectifier means for rectifying an input AC mains signal to produce a DC rectified mains signal, a power factor correction circuit for transferring electrical power from the rectifier means to the primary winding and means for transferring electrical power from the primary winding to the secondary winding. The power factor correction circuit includes a first diode having an anode connected to the rectifier means and a cathode connected to one end of the primary winding and a second diode having an anode connected to the rectifier means and a cathode connected to said one end of the primary winding via a snubber network. The correction circuit can further include a third diode having an anode connected to the rectifier means and a cathode connected to a second end of the primary winding via an inductor.

The present invention advantageously provides a power supply having a power factor correction circuit which is simpler, smaller, cheaper, and produces less interference than prior art solutions.

It will be appreciated that the present invention extends to a display device which includes a display transducer, drive circuitry for generating a raster scanned picture on the CRT in response to one or more video signals provided by an external video source and a power supply as described above.

BRIEF DESCRIPTION OF THE DRAWINGS

A preferred embodiment of the present invention will now be described, by way of example only, with reference to the accompanying drawings in which.

DETAILED DESCRIPTION OF THE INVENTION

Figure 1:
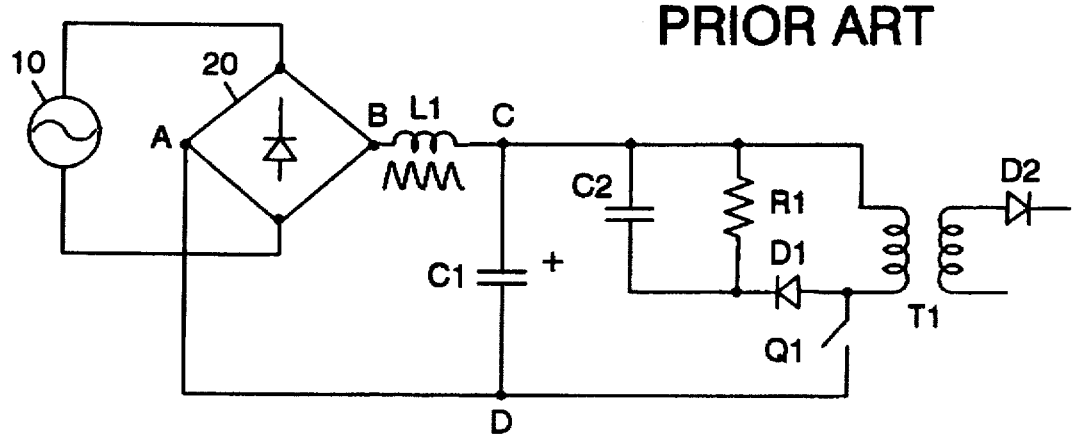
FIG. 1 is a circuit diagram of a conventional switch mode power supply.

Referring to FIG. 1, a conventional switch mode power supply comprises a transformer T1 having a primary winding and a secondary winding. A diode D2 is connected to the secondary winding. One end of the primary winding is connected to a switch Q1. The other end is connected to a bulk storage capacitor C1 at node C. One end of a power factor correction choke L1 is also connected to node C. The other end of L1 is connected to a bridge rectifier circuit 20. A snubber circuit constituted by a capacitor C2, a resistor R1, and a clamp diode D1 is connected between the primary winding and switch Q1. In operation, rectifier 20 DC rectifies AC mains received from an electricity mains outlet 10. The DC rectified mains from rectifier 20 is smoothed by capacitor C1. The smoothed DC rectified mains is applied across the primary winding of transformer T1. Current flows from capacitor C1 through the primary winding back to rectifier 20 when switch Q1 is closed. However, when switch Q1 is opened, current flow in the primary winding stops. Switch Q1 is alternately opened and closed by a drive signal. Energy is transferred from the primary side of transformer T1 to the secondary with each cycle of switch Q1. Energy received on the secondary side of transformer T1 is DC rectified by diode D2 for delivery to a load. Choke L1 increases the conduction angle of the supply thereby increasing the power factor.

Figure 2:
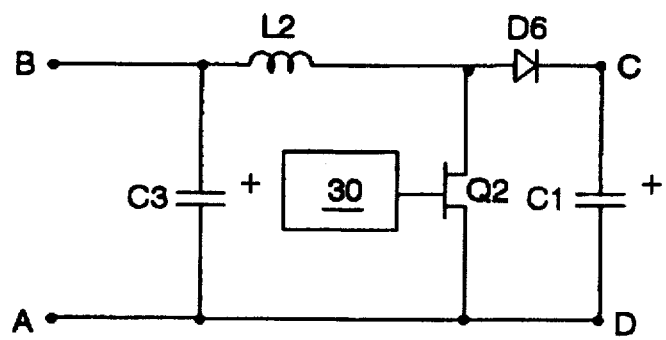
FIG. 2 is a circuit diagram of a conventional modification to the power supply shown in FIG. 1; and, FIG. 3 is a circuit diagram of a switch mode power supply embodying the present invention.

Referring now to FIG. 2, in a conventional modification to the circuit of FIG. 1, choke L1 is replaced by a pre-switcher circuit. The pre-switcher circuit comprises a smoothing capacitor C3 connected across nodes A and B. An inductor L2 is connected at one end to node B. The other end of inductor L2 is connected to a transistor switch Q2 and the anode of a diode D6. The cathode of diode D6 is connected to node C. A control circuit 30 is connected to the control electrode of switch Q2. In operation control circuit 30 drives switch Q2 alternately on and off. This increases the number of current pulses in each cycle of the DC rectified mains voltage from rectifier 20.

Figure 3:
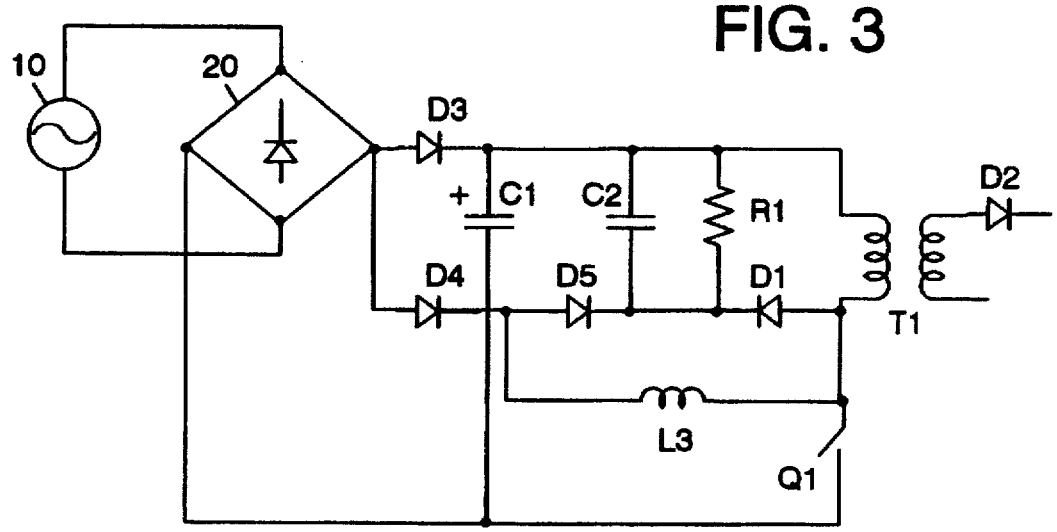

Referring now to FIG. 3, in a preferred embodiment of the present invention, the choke L1 in the power supply of FIG. 1 is replaced by a power factor correction circuit comprising only 3 relatively low cost diodes D3, D4, D5 and a relatively small inductor L3. The anodes of diodes D3 and D4 are connected to node B. The anode of diode D5 is connected to the cathode of diode D4. The cathode of diode D5 is connected to the primary winding of transformer T1 via the snubber network constituted by resistor R1, capacitor C2, and clamp diode D1. The cathode of D3 is also connected to the primary winding of transformer T1. The cathode of D4 is connected to switch Q1 via inductor L3.

In operation, diodes D3, D4, and D5 in combination with inductor L3 admit extra current pulses into transformer T1 during the whole of the rectified sine wave period of the DC rectified mains. Inductor L3 conveys only a portion, typically 15 percent, of the total power to the power supply. The remaining power is supplied via diode D3. In the conventional arrangement of FIG. 1, choke L1 supplies 100 percent of the power. Inductor L3 also supplies power at a high frequency, thereby permitting a cheaper, lighter weight, smaller and more efficient inductor construction based on a ferrite core. In some embodiments of the present invention, there may be some 100 Hz modulation on the waveform of the rectified mains, but ferrite inductor L3 radiates a much lower AC or DC magnetic field than choke L1 in the FIG. 1 arrangement, thereby reducing interference effects.

Diode D5 acts as a clamp diode permitting diode D4 to be implemented by a relatively low specification and thus inexpensive component. It will be appreciated therefore that, in some embodiments of the present invention, D5 may be omitted where D4 is implemented with a higher specification component.

The power factor correction circuit embodying the present invention is particularly applicable to switch mode power supplies in CRT display devices such as television receivers and computer display terminals. It will however be appreciated that the present invention is equally applicable to power supplies for other electrical appliances.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A power supply comprising:

a transformer having a primary winding and a secondary winding, rectifier means for rectifying an input AC mains signal to produce a DC rectified mains signal, a power factor correction circuit for transferring electrical power from the rectifier means to the primary winding, means for transferring electrical power from the primary winding to the secondary winding, and wherein the power factor correction circuit includes a first diode having an anode connected to the rectifier means and a cathode connected to one end of the primary winding and a second diode having an anode connected to the rectifier means and a cathode connected to a second end of the primary winding via an inductor.

2. The power supply of claim 1, wherein said power factor correction circuit further includes a third diode having an anode connected to the rectifier means and a cathode connected to said one end of the primary winding via a snubber network.

* * * * *